United States Patent [19]

Sallay

[11] Patent Number: 4,873,084
[45] Date of Patent: Oct. 10, 1989

[54] INSECTICIDAL COMPOSITION

[76] Inventor: Stephen I. Sallay, 2918 Glencairn Dr., Ft. Wayne, Ind. 46815

[21] Appl. No.: 134,704

[22] Filed: Dec. 18, 1987

Related U.S. Application Data

[63] Continuation of Ser. No. 719,252, Apr. 2, 1985, abandoned, which is a continuation-in-part of Ser. No. 603,340, Apr. 24, 1984, Pat. No. 4,514,326, which is a continuation-in-part of Ser. No. 489,176, Apr. 27, 1983, abandoned, which is a continuation-in-part of Ser. No. 429,133, Sep. 30, 1982, Pat. No. 4,504,546, which is a continuation-in-part of Ser. No. 286,042, Jun. 22, 1981, Pat. No. 4,382,025, which is a continuation-in-part of Ser. No. 135,177, Mar. 28, 1980, abandoned, which is a continuation-in-part of Ser. No. 927,340, Jul. 24, 1978, Pat. No. 4,196,177.

[51] Int. Cl.$^4$ ............................................. A01N 59/14
[52] U.S. Cl. ..................................................... 424/658
[58] Field of Search ........................................ 424/148

[56] References Cited

U.S. PATENT DOCUMENTS

| | | | |
|---|---|---|---|
| 4,400,298 | 8/1983 | Boocock et al. | 424/148 |
| 4,439,488 | 3/1984 | Trimnell et al. | 424/418 |
| 4,610,881 | 9/1986 | Bechgaard | 424/148 |
| 4,657,582 | 4/1987 | Huber | 514/132 |
| 4,719,110 | 1/1988 | Patel et al. | 424/148 |

Primary Examiner—Douglas W. Robinson
Assistant Examiner—Roger Gobrogge
Attorney, Agent, or Firm—Bacon & Thomas

[57] ABSTRACT

It was discovered that the chemical compositions, comprising ammoniumpentaborate and alkali metal and/or alkaline earth metal: sulfates, -sulfites and/or -hydrophosphates are excellent pesticides against wood decaying insects and fungi. The compositions of matter are also useful as fire retardants and anti-smoldering agents in textiles, wood materials and synthetic polymers.

Mixtures of bariumtriborate and these barium salts ($SO_3$, $SO_4$, and/or $HPO_4$) are useful as fire retardants in cellulose materials, paints, adhesives and synthetic polymers. The barium- and calcium-triborate compositions also act as pesticides and are useful in wood preservation against wood boring insects and wood decaying fungi.

Ammoniumpentaborate ($NH_4.B_5O_8.4\ H_2O$), ammoniumtetraborate [$(NH_4)_2.B_4O_7.4\ H_2O$] and disodiumoctaborate ($Na_2B_8O_{13}.4\ H_2O$) undergo reaction in water solution with barium and calcium salts providing bariumtriborate and calciumtriborate, respectively.

8 Claims, No Drawings

INSECTICIDAL COMPOSITION

CROSS-REFERENCE TO RELATED APPLICATIONS

This application is a continuation of Ser. No. 719,252, filed Apr. 2, 1985, now abandoned, which is a continuation-in-part of Ser. No. 603,340, filed on Apr. 24, 1984, now U.S. Pat. No. 4,514,326 entitled, "New, Permanent Flame Retardant and Anti-smoldering Compositions"; which is a continuation-in-part of application Ser. No. 489,176, filed on Apr. 27, 1983, entitled, "New, Permanent Flame Retardant and Anti-smoldering Compositions" and abandoned on Aug. 2, 1984; which application is a continuation-in-part of application Ser. No. 429,133, filed on Sept. 30, 1982, now U.S. Pat. No. 4,504,546, issued on Mar. 12, 1985 and entitled "Method for Flame Retarding Material with Ammoniumtriborate"; which is a continuation-in-part of co-pending application, Ser. No. 286,042, filed on June 22, 1981, now U.S. Pat. No. 4,382,025 dated May 3, 1983, entitled "Ammoniumtriborate, an Effective New Flame Retardant", which application is a continuation-in-part of application, Ser. No. 135,177, filed on Mar. 28, 1980, entitled "Preparation of Flame Retardant Ammoniumborate Compositions" and abandoned on Nov. 4, 1981, which application is a continuation-in-part of application, Ser. No. 927,340, filed on July 24, 1978, now U.S. Pat. No. 4,196,177, issued on Apr. 1, 1980, and entitled "Process for Producing Boron Compounds from Borate Ores". cl BACKGROUND OF THE INVENTION Boron compounds, e.g. boric acid, borax and disodiumoctaborate (TIM-BOR ®, U.S. Borax) or their mixtures have been successfully used as pesticides. These chemicals are readily available and are without any serious health hazard to humans and other mammals at levels which are highly toxic to wood boring insects and to some of the decay fungi.

Timber preservation research, using boron compounds, dates back to the Forties and as a result, large scale commercial application of diffusion impregnation of timber was developed first in Australia and New Zealand. (A. N. Christiansen and E. J. Williams, Australian J. Applied Science, 411–429, 1951; K. M. Harrow, New Zealand J. Sci. Tech. B32(4), 28–38, 1951; A. McNabb and W. B. Taylor, ibid., B35(1), 113–126, 1953).

A paper by J. Thornton, titled "Boron Preservation of European Timber" (Borax Consolidated Ltd., Borax House, Carlisle Place, London SW1, 1964) reviews the history and technology of boron diffusion into timber.

Boron treatments have been used since about 1982 in the U.S. wood industry. A vacuum and/or pressure dip-diffusion treatment of unseasoned wood with disodiumoctaborate solution (TIM-BOR ®) provides excellent protection of wood against wood boring insects (L. H. Williams, Proceedings, Twelfth Annual Hardwood Symposium, Hardwood Research Council, 154–163, 1984).

Other insecticides, such as Lindane ($\gamma$-hexachlorocyclohexane), polyhalogenated Diels-Alder products: Dieldrin and Aldrin are toxic in humans and represent health hazard in the environment. Thus, environmentally compatible pesticides, such as boron products, are promising replacements for the above listed poisonous, teratogenic, halogenated organic compounds.

SUMMARY OF THE INVENTION

This invention relates to environmentally harmless pesticides: mixtures of ammoniumpentaborate and alkali- and/or alkaline earth metal salt(s) (such as sulfites, sulfates and phosphates) which are useful pesticides against wood boring and other insects and certain fungi and are described in my co-pending application, Serial Number 603,340, filed on April 24, 1984 and entitled "New, Permanent Flame Retardant and Anti-smoldering Compositions", the entire disclosure of which is herein incorporated by reference.

Furthermore, this invention describes the reaction between the said mixtures of ammoniumpentaborate and alkali- and/or alkaline earth metal salts and water soluble barium or calcium salts which result in poorly soluble barium- or calciumtriborate and the corresponding barium or calcium salts: sulfite, sulfate and/or hydrophosphate. These new barium and calcium salt compositions are also useful pesticides, fungicides and fire retardants.

DETAILED DESCRIPTION OF THE INVENTION

The chemical compositions of matter, described in my co-pending application, Serial Number 603,340 (1984) and their barium and calcium derivatives besides being noncorrosive flame retardants were also found to be excellent pesticides providing several important advantages over other boron products published in the literature.

The active ingredient present in all of the new compositions is ammoniumpentaborate. Ammoniumpentaborate serves as a precursor of boric acid which is formed during its ingestion b the insects. Boric acid is known to be toxic to insects such as termites, powderpost beetles, black carpet beetles, fire ants, carpenter ants, carpenter bees, cockroaches, silver fish, housefly and other insects. Ammoniumpentaborate and bariumtriborate or calciumtriborate mixed with barium- or calciumsulfite, and/or bariumhydrophosphate and calciumhydrophosphate are useful pesticides against insects and brown rot fungi. Bariumtriborate and calciumtriborate in an analogous fashion to ammoniumpentaborate also produces in vivo boric acid in insects.

Boric acid is toxic to insects in very low concentrations (0.05–0.2%) in wood, but its mode of action is unknown. Besides boric acid, ammonia is also liberated from ammoniumpentaborate in the gut of wood decaying insects. Ammonia neutralizes the acidity ($p_H$ 5.0–6.0) of the content of the insect's gut and thus inhibits the activity of cellulase enzyme which is essential for the acid catalyzed hydrolysis of cellulose to glucose in wood boring insects.

Due to the base strength differences between ammonia and sodiumhydroxide, the liberation of boric acid from ammoniumpentaborate is significantly easier than from sodiumborates, such as borax and disodiumoctaborate.

A further advantage of the ammoniumpentaborate compositions is their excellent water solubility. Thus, a 60% water solution of ammoniumpentaborate and sodiumhydrophosphate mixture can be maintained between 30°–35° C. As a comparison, a 35% disodiumoctaborate solution needs to be heated at 57° C. to keep the chemical in solution. Both solutions contain 41.92% boric acid equivalent (BAE) content.

A further advantage of the ammoniumpentaborate containing compositions is that they are also useful flame retardants and antismoldering agents with non-corrosive properties, as described in my co-pending U.S. patent application, Ser. No. 603,340 (1984). On the contrary, alkali metal borates applied alone are not useful as flame retardants because they do not undergo thermodissociation as ammoniumpentaborate does. The latter dissociates to ammonia and borontrioxide above 200° C. Borontrioxide forms a glassy flux at higher temperatures and acts as fire retardant. Consequently, my compositions are useful as pesticides and flame retardants when applied at an appropriate level in wood materials.

Another important advantage of the ammoniumpentaborate compositions is that they exhibit a higher toxicity in wood against insects than disodiumoctaborate does. Exposure tests were conducted with Formosan subterranean termite (Coptotermes formosanus, Shiraki) to banak wood (Virola spp.) by pressure treatment, using a 2% water solution of ammoniumpentaborate-sodiumsulfate composition. The test was carried out according to the American Society for Testing Materials Standard Test, D3345-74 (Reapproved 1980). The test clearly proved the high level of toxicity of the pentaborate composition to termites. A nearly total mortality occurred after two weeks while survival exceeded 95% for termites exposed to untreated wood.

A 2% disodiumoctaborate (TIM-BOR ®) or a 2% pentaborate mixture have marked differences between their boric acid equivalent (BAE) content. Whereas a 2% TIM-BOR ®solution has 2.40 g BAE, a 2% concentration of ammonium-pentaborate-sodiumsulfate solution contains 1.38 g BAE, which corresponds to a 42.7% lower value. Yet, the lower BAE level of the ammoniumpentaborate composition shows insecticidal and wood penetration characteristics equal to the 42.7% higher BAE containing TIM-BOR ®solution.

CHEMISTRY OF THE INVENTION

In addition to the ammoniumpentaborate containing compositions, new barium- and calciumborate compositions were also discovered which are potent pesticides and flame retardants. Flame retardation of these compositions was observed in wood and in synthetic polymers.

It has been found that a water solution of the ammoniumpentaborate-sodiumsulfate and/or sulfite, hydrophosphate mixtures upon treatment of water soluble barium salts, such as bariumchloride, bariumacetate, or bariumhydroxyde produce new compositions of matter: bariumtriborate-bariumsulfate, bariumtriborate-bariumsulfite, and/or bariumtriborate-bariumhydrophosphate. Similar reaction takes place between the above ammoniumpentaborate compositions and water soluble calcium salts or calciumhydroxyde, yielding calciumtriborate and the corresponding calcium salts: sulfate, sulfite and/or hydrophosphate.

It was then discovered that the reaction between ammoniumpentaborate and bariumchloride which proceeded first in about 60% yield can be improved to >90% yield in the presence of appropriate amount of ammonia (Eq.1).

$6NH_4.B_5O_8.4H_2O + 5BaX_2 + 4NH_3 + 2H_2O \longrightarrow$ (Eq. 1)
Ammoniumpentaborate

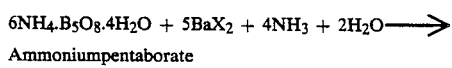

-continued
$5Ba(B_3O_5)_2.4H_2O + 10NH_4.X$
Bariumtriborate $X = Cl, acetate$

Furthermore, it was found that ammoniumtetraborate also produces bariumtriborate when treated with barium salt in a water solution (Eq. 2).

$6(NH_4)_2B_4O_7.4H_2O + 4BaX_2 \longrightarrow$ (Eq. 2)
Ammoniumtetraborate $4Ba(B_3O_5)_2.4H_2O + 8NH_4.X + 4NH_3 + 2H_2O$
Bariumtriborate $X = Cl, acetate$ In light of my co-pending application, Ser. No. 603,340 (1984) these are rather unexpected reactions. In that application it was discovered that alkalitetraborates undergo a three-step transformation in the presence of ammonium salts to ammoniumtetraborate, ammoniumtriborate and ammoniumpentaborate (Eq. 3). Furthermore, the intermediates: ammoniumtetraborate and ammoniumtriborate also can be transformed into ammoniumpentaborate in water. However, in the presence of barium or calcium ions the final product of Eq. 3, ammoniumpentaborate reverts to the triborate stage which is metastable in its ammonium salt form.

$15M_2B_4O_7.nH_2O + 15(NH_4)_2X \xrightarrow{\text{Step 1}}$ (Eq. 3)
Tetraborate $15(NH_4)_2.B_4O_7.4H_2O + 15M_2X + nH_2O \xrightarrow{\text{Step 2}}$
Ammoniumtetraborate $20NH_4.B_3O_5 + 10NH_3 \xrightarrow{\text{Step 3}} 12NH_4.B_5O_8.4H_2O + 8NH_3$
Ammoniumtriborate (metastable)      Ammoniumpentaborate $M = Na, K and/or \frac{1}{2}Can = 0-10$
$X = SO_3, SO_4 and/or HPO_4$ Bariumtriborate has been described earlier by A. N. Karibyan et al. (Promst. Arm., 7, 38–39, 1974; Chem. Abstr. 81, 144792e). They reacted borax with bariumchloride in water solution and identified three compounds: bariumtriborate, bariumtetraborate and $BaB_6O_{11}.6 H_2O$. The new bariumtriborate compositions, however, encompass other barium salts (sulfite, sulfate and/or hydrophosphate), as well. Borate ores, e.g., Gowerit and Nobeleit are calciumtriborates.

From the above findings, it was first believed that the ammonium-ion of ammoniumpentaborate or ammoniumtetraborate played a key role in the formation of bariumtriborate. Indeed, borax and one mole equivalent amount of bariumchloride provided bariumtetraborate in my hands. It was therefore interesting to find that another sodiumborate: disodiumoctaborate (TIM-BOR ®) unexpectedly produced bariumtriborate instead of bariumtetraborate in high yield upon bariumchloride treatment (Eq.4).

$6Na_2B_8O_{13}.4H_2O + 8BaCl_2 + 4NH_3 + 2H_2O \longrightarrow$ (Eq. 4)
Disodiumoctaborate -continued $$8Ba(B_3O_5)_2.4H_2O + 12NaCl + 4NH_4Cl$$

Bariumtriborate

Pure bariumtriborate or calciumtriborate also can be manufactured from mixtures of ammoniumpentaboratesodiumchloride and/or ammoniumpentaboratesodiumnitrate. The precipitated barium or calciumtriborate can be purified by dissolving the water soluble by-products.

USE AND APPLICATION OF BARIUM- AND CALCIUMBORATE COMPOSITIONS

It was already discussed above that besides bariumtriborate, barium-sulfate, -sulfite and/or -hydrophosphate are also being generated during the reaction between a mixture of ammoniumpentaborate plus alkali metal-sulfate, -sulfite and/or -hydrophosphate and water soluble barium salts. These new compositions of matter: bariumtriborate plus bariumsulfate, bariumsulfite and/or -hydrophosphate are also useful pesticides. The analogous calcium compositions possess similar usefulness.

Furthermore, bariumtriborate and the commingled barium salts ($SO_4$, $SO_3$, $HPO_4$) or their calcium analogs which have poor water solubilities can be generated in situ on a wood surface which were previously treated with ammoniumpentaborate compositions. The spraying and dipping of ammoniumpentaborate treated wood with ammonia containing bariumchloride or bariumhydroxyde solution instantly forms these sparingly soluble barium salts which act as sealants by encapsulating the water soluble ammoniumpentaborate composition will act as pesticide and mold resistant and provides protection against leaching out of the insecticidal ammoniumpentaborate from wood. Similar results can be achieved by the analogous calciumtriborate and commingled calcium sulfate, sulfite and/or hydrophosphate when calciumchloride calciumhydroxide is applied on the ammoniumpentaborate treated wood.

Alternatively, the mixture of barium and calcium compositions can be finely milled and used as suspensions in an organic carrier such as light petroleum for pressure-treatment of seasoned wood material.

Although the heretofore described boron compositions possess some fungicidal activities, nevertheless it is advisable to add appropriate amounts of mildewcides to the boron compositions. As examples one can add methylene bis-(thiocyanate), (Busan ®, Buckman Laboratories, Memphis, Tenn.); 3-iodo-2-propynyl butyl carbamate, (Troysan Polyphas ®, Troy Chemical Corp., Newark, N.J.), sodium pentachlorophenolate, or propionic acid salts, e.g. $NH_4$-, Na-, Ca-, Ba-, Mg- or N-alkylpyridinium-propionate/s in 0.005-2.0% add-on level.

Bariumtriborate containing compositions of this invention are also useful as flame retardants in synthetic fibers. Bariummetaborate ($BaO.B_2O_3$) was reported and patented by German authors as replacements up to 50% of the expensive antimonytrioxide in polyvinylchloride (PVC) without the loss of its fire resistance (H. P. Skilandat, B. Taubert, Plaste Kautsch., 1976, 192-197; Chem. Abstr. 85, 6464f and B. Taubert, A. Hopp and H. P. Skilandat, Ger. P. (East) 130,025 1976; Chem. Abstr., 91, 76277v).

The newly discovered bariumtriborate containing compositions are also useful for improving the fire retardancy of polymers. In my earlier U.S. Pat. Ser. No. 4,504,546 (1985) it was pointed out that ammoniumpentaborate is also useful as fire retardant in polymers.

Cellulose, or synthetic fibers were pressure polymerized with phenol-formaldehyde polymer to mats which provide acoustical panels for automotive industry and building industry. Ammoniumpentaborate compositions used in phenol-formaldehyde polymer have passed the 25 foot tunnel test and were qualified as Class I products.

The pesticides and flame retardants described in this continuation-in-part of my co-pending invention, Ser. No. 603,340 (1984) can be applied on virgin, processed, reconstituted or recycled, cellulose or cellulosolignin materials such as timber, railroad ties, plywood, composite wood, wood chips, newsprints and other wood materials; glues, paints and as fire retardants in synthetic polymers.

The following examples are given as illustrations of the present invention but are not to be considered as limiting the same.

EXAMPLE 1

A well-stirred mixture of 73.5 kg borax pentahydrate and 33.4 kg ammoniumsulfate in 45 l of water was heated to its boiling point. After 30 l of water, carrying the liberated ammonia was distilled off, about 95 l of hot syrup remained in the reaction vessel. A hot spray-drying or flaking resulted in a solid mixture of ammoniumpentaborate and sodiumsulfate. One recrystallization of the crude product yielded pure ammoniumpentaborate.

EXAMPLE 2

Following the procedure of Example 1, but substituting ammoniumsulfate with ammoniumsulfite or diammoniumhydrophosphate or alternately with ammonia gas, plus sulfurdioxide, or ammonia gas and phosphoric acid ammoniumpentaborate and sodiumsulfite or ammoniumpentaborate and disodiumhydrophosphate were obtained.

Thus, 48.6 ml concentrated ammoniumhydroxide (28% NH content), representing 136 g ammonia (8 mole) was diluted by 600 ml water and within 10 min 560 ml (920 g) phosphoric acid (85%) (8 mole) diluted by 600 ml water was added to the stirred mixture. The temperature of the reaction mixture rose to 80° C. Then, to the stirred, hot mixture 2330.4 g (8 mole) borax .5 $H_2O$ was added at once, which cooled the temperature to 52° C. The clear mixture was then stirred and the excess of ammonia was distilled off with the help of an additional 4 l water. The residual thick syrup was then diluted by water up to 4720 ml which yielded a clear, colorless solution containing 59.2% (weight/volume) solid content. The solution contained 36.5% ammoniumpentaborate (41.92% BAE). Its specific gravity is 1.33/32° C. The solution's $p_H$ is between 7-8 and is ready for dip-diffusion of timber. The solution remains clear at $\geq 35°$ C.

Example 3

The composition of Example 1 can be manufactured by the following alternate technology. One mole amount of alkali and/or alkaline earth metal tetraborate is transformed in a hot solution with the help of one mole equivalent of sulfuric acid and with a minimum amount of 0.8 mole ammonia into ammoniumpentaborate and the corresponding metal sulfate.

Thus, a solution of 48.6 ml concentrated ammoniumhydroxide (0.8 mole) in 200 ml water, or 13.6 g (0.8 mole) ammonia in 240 ml water was treated with 98 g (53.3 ml) concentrated sulfuric acid while the temperature rose over 70° C. (Alternately, ammonia can be added to sulfuric acid.) The hot solution was then treated in one batch with 291.3 g (1 mole) borax and with the help of a short heating a clear solution was obtained. During this process a rapid and a practically quantitative transformation of the tetraborate to ammonium pentaborate occurred. The hot, clear solution contains about 70% solid and can be directly applied as fire retardant and/or pesticide.

From the reaction mixture ammoniumpentaborate crystallized at room temperature. One recrystallization from water provided pure ammoniumpentaborate ($\lambda_{max}^{KBr}$ 3400, 3240 (broad), 1650, 1430, 1350, 1250, 1100, 1030, 920, 780, and 690 cm$^{-1}$).

Alternately, the hot reaction mixture can be evaporated or spray-dried to a mixture of solid ammoniumpentaborate and sodiumsulfate. During the removal of water less than 5% of the applied ammonia was distilled off.

EXAMPLE 4

Following the procedure of Example 3, but substituting sulfuric acid with sulfurous acid ($SO_2$ in water) or phosphoric acid, mixtures of ammoniumpentaborate and alkali and/or alkaline earth metal sulfites or hydrophosphates were obtained.

EXAMPLE 5

Ammoniumpentaborate (16.3 g) was dissolved in 0 ml water, containing 0.7 g ammonia. The clear solution was treated with 12.2 g bariumchloride dissolved in 30 ml water. The two solutions instantly produced bariumtriborate as a fine crystalline precipitate which after drying weighed 19.7 g (90.9% yield). Theor. yield is 21.67 g. $\lambda_{max}^{KBr}$ 3520, 3400 (broad), 1630 (small), 1450 (shoulder), 1365 (very strong), 1190 (small) 1130 (small), 1020 (very strong), 930 (small), 885 (medium), 815 (medium), 795 (small), 740 (medium), 685 (medium) cm$^{-1}$.

| Analysis for $BA(B_3O_5)_2 \cdot 4 H_2O$: | |
|---|---|
| $Ba_{calc'd}$: 31.63% | $B_{calc'd}$: 14.93% |
| $Ba_{found}$: 31.85% | $B_{found}$: 14.69% |
| Solubility in water: 0.39%/20° C. | |

Bariumtriborate was found to be stable at 300° C./3 hours.

EXAMPLE 6

Following the procedure of Example 5, but substituting ammoniumpentaborate with 5.26 g (0.02 mole) ammoniumtetraborate which upon reacting with 4.88 g (0.02 mole) bariumchloride provided bariumtriborate in good yield. The composition was proven by barium and boron analyses (determined as boric acid) and IR spectrum.

EXAMPLE 7

Following the procedure of Example 5, but substituting ammoniumpentaborate with a solution of 8.24 g (0.02 mole) disodiumoctaborate in 30 ml water and 6.51 g (0.026 mole) bariumchloride in 15 ml water 10.3 g (89.1%) bariumtriborate was obtained. The IR spectrum and elemental analysis verified the composition.

EXAMPLE 8

Following the procedure of Example 5, but substitute ammoniumpentaborate with 5.82 g (0.02 mole) borax pentahydrate and using 3.08 g (0.0126 mole) bariumchloride in a total of 33 ml boiling water (1 hr), 4.1 g bariumtetraborate was isolated. The analysis for $BaB_4O_7 \cdot 4 H_2O$ showed a B/Ba ratio of 4.01:1. IR spectrum showed $\lambda_{max}^{KBr}$ 3400 (broad), 1640 (medium), 1420 (shoulder), 1340 (broad, very strong), 1000 (broad, very strong), 730 (weak), 690 (weak) cm$^{-1}$.

EXAMPLE 9

A mixture of ammoniumpentaborate and sodiumsulfate, or -sulfite and/or -hydrophosphate was rendered to about $p_H 8$ by ammoniumhydroxide and treated with bariumchloride solution. Alternately, bariumhydroxyde can be used without the application of ammoniumhydroxyde. White precipitate was formed spontaneously: bariumtriborate mixed with bariumsulfate, or bariumsulfite and/or bariumhydrophosphate and was isolated by filtration in nearly quantitative yield. The filtered, washed micro-crystalline white powder contains no ammonium ion and has a low water solubility.

Thus, a mixture of 10.82 g ammoniumpentaboratesodiumsulfate of Example 1 was dissolved in 50 ml hot water. The solution was rendered alkaline by ammoniumhydroxide ($p_H 8$) and treated with 12.2 g bariumchloride solution dissolved in 30 ml water. The microcrystalline precipitate: bariumtriborate-bariumsulfate weighed 15.7 g (yield 100%). Its water solubility is ~1.0%/20° C.

EXAMPLE 10

Following the procedure of Example 2 or 3, but using ammoniumchloride or ammoniumnitrate, or alternately ammonia and hydrogenchloride or nitric acid instead of ammoniumsulfite or hydrophosphate, a mixture of ammoniumpentaborate and sodiumchloride or sodiumnitrate was obtained.

EXAMPLE 11

Following the procedure of Example 9, but substituting ammoniumpentaborate and sodiumsulfate, sodiumsulfite and/or sodiumphosphate with ammoniumpentaborate and sodiumchloride or sodiumnitrate, a mixture of bariumborate and bariumchloride or bariumnitrate was formed. The latter by-products can be removed by water, yielding pure bariumtriborate.

EXAMPLE 12

Following the procedure of Example 9, but substituting bariumchloride or bariumhydroxyde with soluble calcium salts, such as calciumchloride or alternately with calciumhydroxyde, a mixture of calciumtriborate and the corresponding poorly soluble calcium-sulfate, -sulfite and/or -hydrophosphate were obtained.

EXAMPLE 13

Following the procedure of Example 5, but substituting bariumchloride with calciumchloride or calciumhydroxyde, calciumtriborate was obtained.

EXAMPLE 14

Following the procedure of Example 10 and treating its product with calciumchloride, calciumtriborate and calciumnitrate was formed. The latter and the commingled calciumchloride by-products were readily dissolved in water and pure calciumtriborate was isolated by filtration.

EXAMPLE 15

Unseasoned banak wood pieces were vacuum and/or pressure treated with 2% ammoniumpentabate-sodiumsulfate or ammoniumpentaborate-sodiumhydrophosphate solutions. For about six weeks, while the diffusion process of the chemicals took place, the wood samples were wrapped into plastic sheets and protected from drying. Termite treatments of the wood samples, carried out according to the ASTM Standard Test, D3345-74 have shown a total mortality of termites between 2 and 4 weeks with a small weight loss of wood. Control studies on untreated wood showed a >95% survival of termites.

Adding Busan® or Troysan® mildewcide to the above ammoniumpentaborate-salt mixture secures wood against insects and fungi.

EXAMPLE 16

Unseasoned or seasoned hickory wood blocks (1.5×2×6″) were dipped for about 30 seconds into 59.2% ammoniumpentaborate-sodiumhydrophosphate solution of Example 2 and dried at room temperature. Then a spray with ammonia containing bariumchloride formed a white bariumtriborate-bariumhydrophosphate protective coating on the wood surface. Wood samples resisted ignition four times longer (132 seconds) than the untreated wood blocks which bursted into flame within 25-30 seconds. Flame height of the Bunsen burner was 3″ and the tip of the flame reached the wood surface. A cross section of the treated wood has shown only about 2 mm ammoniumpentaborate penetration. Longer diffusion time of the boron containing chemicals secures complete fire retardation, as well as protection against pests.

Bariumtriborate, bariumtetraborate or calciumtriborate containing diet fed to termites showed comparable toxicity with ammoniumpentaborate.

EXAMPLE 17

Cotton, nylon, polyester, rayon or other polymeric fibers were treated and heat polymerized under pressure with a finely ground mixture of the phenol-formaldehyde polymer precursors and 15-30% ammoniumpentaboratesodiumsulfate of Examples 1 or 3. The porous, compacted materials passed the 25 foot tunnel test representing Class I products as acoustical mats for building industry and sound proofing fire walls for the automotive industry.

EXAMPLE 18

Ammoniumtetraborate (ammoniumbiborate) was refluxed in water while ammonia evolution was observed. After 30-120 minutes of reflux the solvent was removed and the crystalline residue was found to be ammoniumpentaborate.

EXAMPLE 19

A mixture of ammoniumpentaborate (0.01–5.0%) and a mildewcide, such as Busan®, Troysan® or sodium pentachlorophenolate (0.01–2.0%) in water solution was sprayed on or dip-diffused into wood. Wood boring insects, such as termites and lyctid beetles, as well as wood decay fungi were controlled by the above mixture.

I claim:

1. An insecticidal composition comprising an aqueous solution containing a insecticidally effective amount of from 0.01–5.0% of ammonium pentaborate and from 0.01–2.0% of a mildewcide.

2. The composition of claim 1 wherein the mildewcide is methylene bis-(thiocyanate), 3-iodo-2 propynyl butyl carbamate, sodium pentachlorophenolate, or a propionic acid salt.

3. The insecticidal composition of claim 1 wherein the insect is a wood boring insect.

4. The composition of claim 2 wherein the insect is a wood boring insect.

5. The composition of claim 3 wherein the wood boring insects are termites.

6. The composition of claim 4 wherein the wood boring insects are termites.

7. A method of controlling degradation of wood by wood boring insects and fungi which comprises applying the composition of claim 1 to wood by spraying or dip-diffusion.

8. The method of claim 7 wherein the wood boring insects are termites.

* * * * *